(12) United States Patent
Malenke et al.

(10) Patent No.: US 8,002,513 B2
(45) Date of Patent: Aug. 23, 2011

(54) FOOD PRODUCT CONVEYOR AND HANDLING SYSTEMS

(75) Inventors: Mark Malenke, Sun Prairie, WI (US); Scott Adler, Green Bay, WI (US); David Hess, Green Bay, WI (US); Tod Heleniak, Green Bay, WI (US); Brian Tomac, Depere, WI (US)

(73) Assignee: Kraft Foods Global Brands LLC, Northfield, IL (US)

( * ) Notice: Subject to any disclaimer, the term of this patent is extended or adjusted under 35 U.S.C. 154(b) by 296 days.

(21) Appl. No.: 11/836,564

(22) Filed: Aug. 9, 2007

(65) Prior Publication Data

US 2009/0038913 A1 Feb. 12, 2009

(51) Int. Cl.
*B65G 57/00* (2006.01)
(52) U.S. Cl. ............... 414/790.5; 414/793.4; 414/790.6
(58) Field of Classification Search .... 198/369.1–369.2; 271/176, 180, 192, 213, 188–189, 209; 414/789, 414/789.3, 789.8, 790.4, 791.5, 793.4, 794, 414/794.4, 924, 790, 790.5, 791.1
See application file for complete search history.

(56) References Cited

U.S. PATENT DOCUMENTS

| | | | | |
|---|---|---|---|---|
| 2,497,874 A | * | 2/1950 | Evans et al. ............... | 198/349.3 |
| 2,886,929 A | * | 5/1959 | Villemont ................. | 53/438 |
| 3,003,541 A | * | 10/1961 | Prentice et al. ............ | 156/263 |
| 3,205,794 A | * | 9/1965 | Califano et al. ........... | 414/789.1 |
| 3,392,853 A | * | 7/1968 | Mitchell et al. ........... | 414/790.6 |
| 3,411,638 A | * | 11/1968 | Dryon ....................... | 414/793.4 |
| 3,420,386 A | * | 1/1969 | Morrow et al. ............ | 414/790 |
| 3,567,047 A | * | 3/1971 | Clausen et al. ............ | 271/176 |
| 3,873,755 A | | 3/1975 | McKay | |
| 3,880,035 A | | 4/1975 | Divan | |
| 3,934,705 A | | 1/1976 | Balch et al. | |
| 3,941,234 A | | 3/1976 | Balch et al. | |

(Continued)

FOREIGN PATENT DOCUMENTS

DE 102004056031 A1 5/2006

(Continued)

OTHER PUBLICATIONS

A European Search Report dated Nov. 12, 2008 from the European Patent Office in corresponding European Patent Application No. 08162040.3.

(Continued)

*Primary Examiner* — Gregory W Adams
(74) *Attorney, Agent, or Firm* — Fitch, Even, Tabin & Flannery

(57) ABSTRACT

A conveyor system for assembling and stacking sliced food products is provided. The conveyor system includes an assembly area, wherein groups of a predetermined quantity of sliced food products travel from a slicer on a conveyor and are deposited on discrete carrier sheets on a downstream conveyor. The assembly area is configured to delay advancement of the carrier sheets on the downstream conveyor until a group of the predetermined quantity is formed. The slicer is configured to calculate the number of slices in each group and determine whether a group is complete. A stacking area of the conveyor system includes a nose conveyor that extends and retracts to deposit each carrier sheet onto a pair of initial supports. The initial supports reciprocate away from each other in opposing directions to drop the carrier sheet onto a subsequent level, with the initial supports reciprocating each time a carrier sheet is deposited thereon.

18 Claims, 9 Drawing Sheets

U.S. PATENT DOCUMENTS

| | | | |
|---|---|---|---|
| 3,985,052 A | | 10/1976 | Balch et al. |
| 4,065,911 A | | 1/1978 | Fagan |
| 4,104,846 A | | 8/1978 | Waller |
| 4,135,616 A | | 1/1979 | Pellaton |
| 4,137,604 A | * | 2/1979 | Sandberg et al. ............ 99/450.1 |
| 4,236,855 A | * | 12/1980 | Wagner et al. ............. 414/789.5 |
| 4,313,669 A | * | 2/1982 | Larson et al. ................ 396/661 |
| 4,405,186 A | * | 9/1983 | Sandberg et al. ............... 414/21 |
| 4,894,976 A | | 1/1990 | Wallace |
| 4,917,911 A | | 4/1990 | Bush et al. |
| 4,934,687 A | * | 6/1990 | Hayden et al. ................ 271/202 |
| 4,938,336 A | * | 7/1990 | Aquino et al. ............. 198/369.2 |
| 4,938,657 A | * | 7/1990 | Benson et al. ............ 414/790.4 |
| 4,967,652 A | | 11/1990 | Mally |
| 5,020,305 A | | 6/1991 | Treiber |
| 5,064,667 A | | 11/1991 | Mally |
| 5,088,592 A | * | 2/1992 | Palmers ..................... 198/465.3 |
| 5,132,126 A | | 7/1992 | Sinkler et al. |
| 5,370,382 A | * | 12/1994 | Wetter .......................... 271/183 |
| 5,407,693 A | | 4/1995 | Brooks et al. |
| 5,419,677 A | * | 5/1995 | Cohn ........................ 414/789.5 |
| 5,520,944 A | | 5/1996 | Richardson et al. |
| 5,595,776 A | | 1/1997 | Selz |
| 5,693,353 A | | 12/1997 | Selz |
| 5,921,690 A | * | 7/1999 | Shinmachi et al. ........... 400/625 |
| 5,961,274 A | * | 10/1999 | Bors ............................. 414/791 |
| 6,053,695 A | * | 4/2000 | Longoria et al. ........... 414/790.8 |
| 6,227,376 B1 | | 5/2001 | Handel et al. |
| 6,231,043 B1 | * | 5/2001 | James et al. ................... 271/209 |
| 6,263,640 B1 | | 7/2001 | Handel |
| 6,701,841 B2 | * | 3/2004 | Tsurumaki ..................... 101/419 |
| 6,827,545 B2 | * | 12/2004 | Ward ......................... 414/793.4 |
| 2001/0023570 A1 | | 9/2001 | Handel |
| 2009/0038453 A1 | | 2/2009 | Malenke et al. |

FOREIGN PATENT DOCUMENTS

| | | | |
|---|---|---|---|
| DE | 102004060393 A1 | | 7/2006 |
| EP | 0257852 A2 | | 3/1988 |
| EP | 0373844 A1 | | 6/1990 |
| EP | 0373844 B1 | | 11/1992 |
| EP | 713835 A1 | * | 5/1996 |
| EP | 0733449 A2 | | 9/1996 |
| GB | 2139876 A | | 11/1984 |
| GB | 2397285 A | * | 7/2004 |
| JP | 60180558 A2 | | 9/1985 |
| JP | 2219537 A2 | | 9/1990 |
| WO | 9535238 A1 | | 12/1995 |
| WO | 2006038796 A1 | | 4/2006 |

OTHER PUBLICATIONS

A European Search Report dated Dec. 12, 2008 from the European Patent Office in European Patent Application No. 08162039.5 that corresponds to related U.S. Patent Application Publication No. 2009/0038453 to Malenke et al.

* cited by examiner

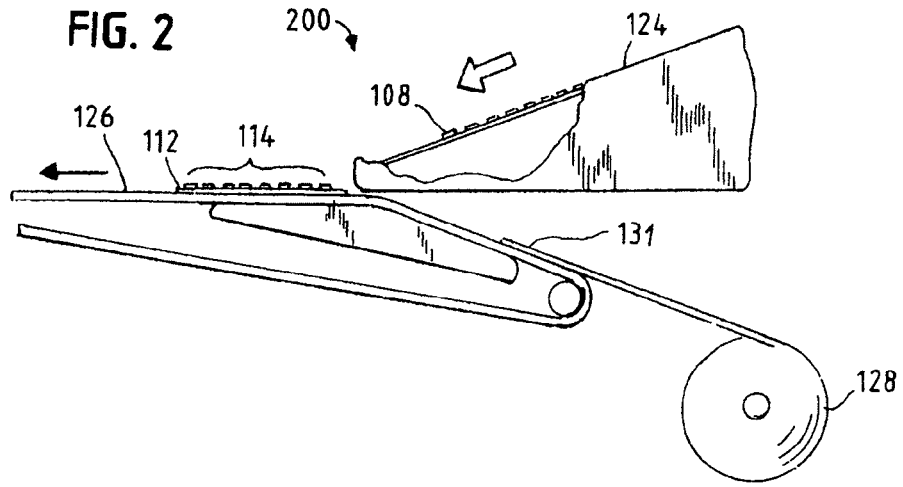
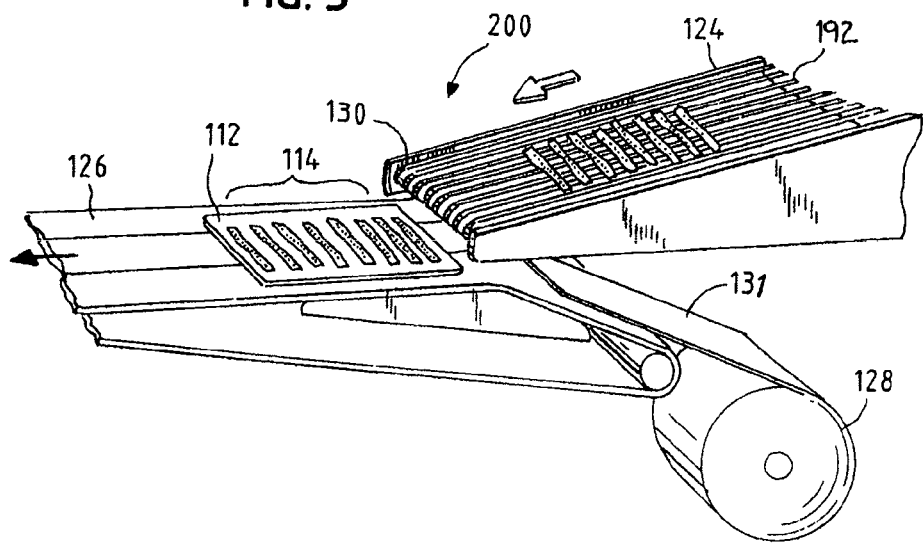
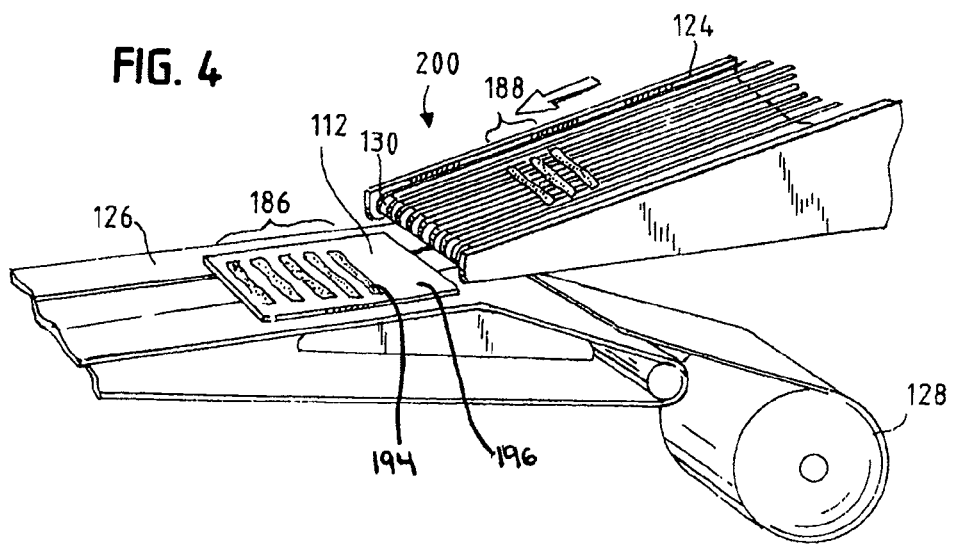

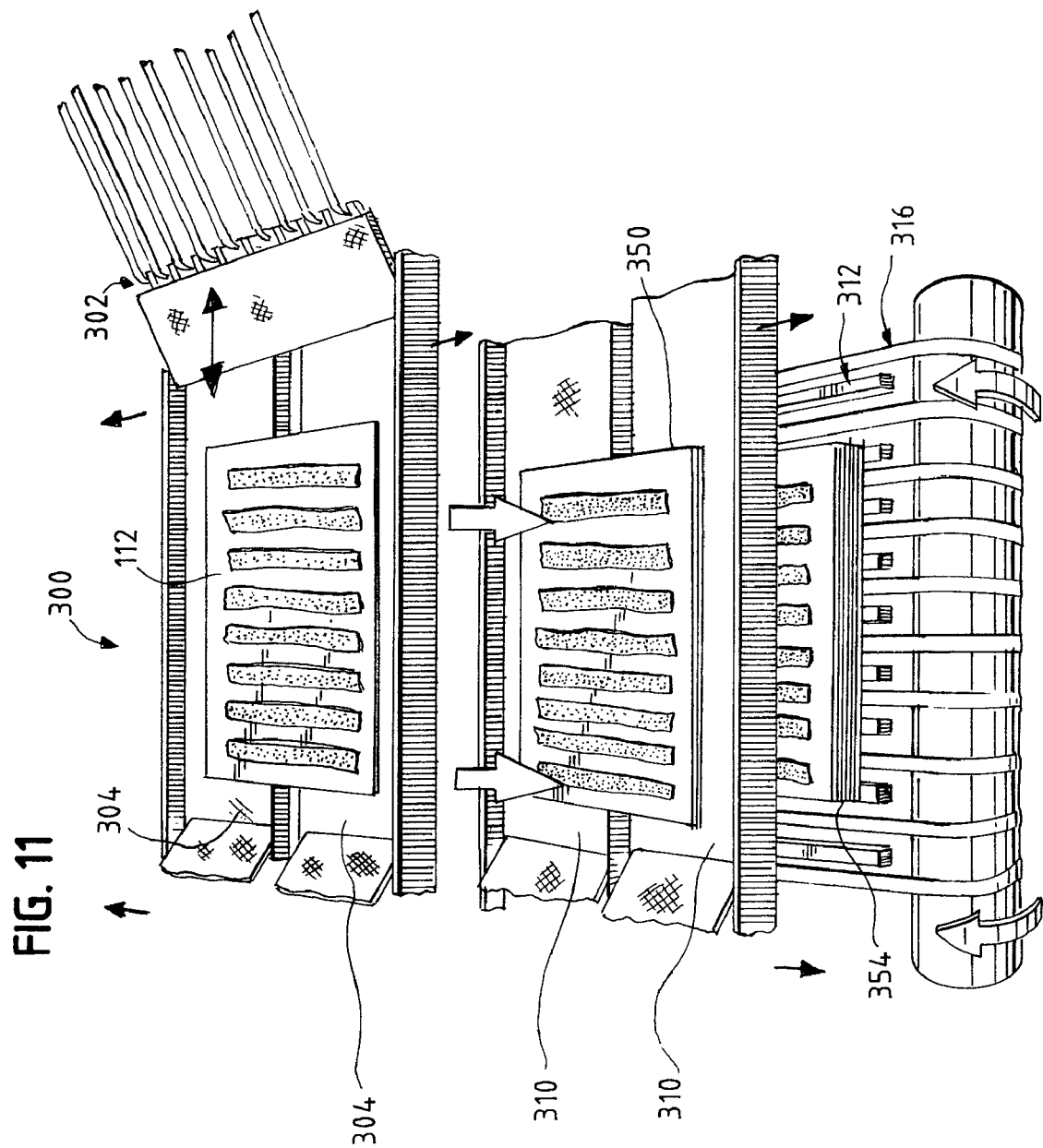

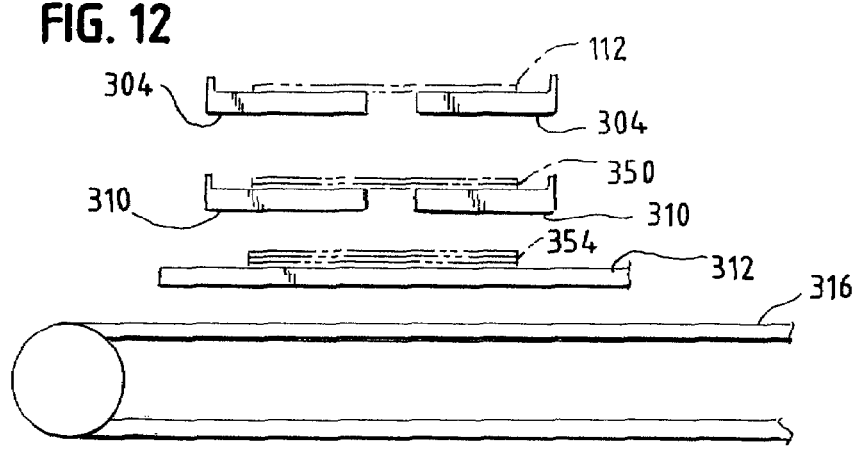
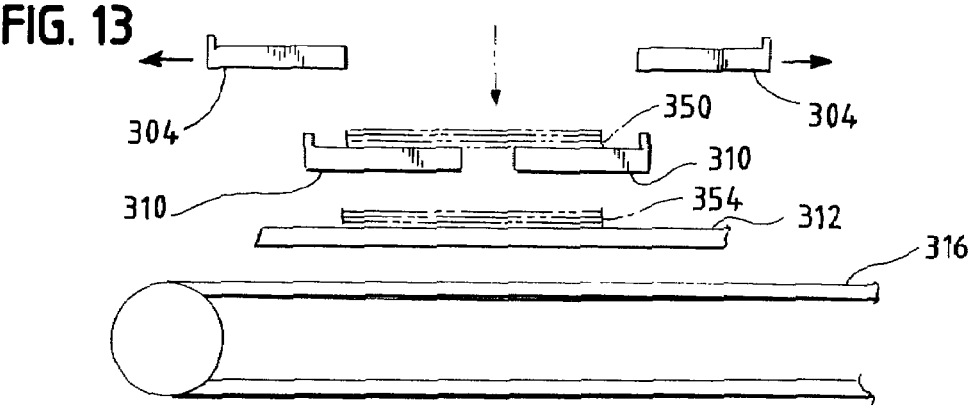
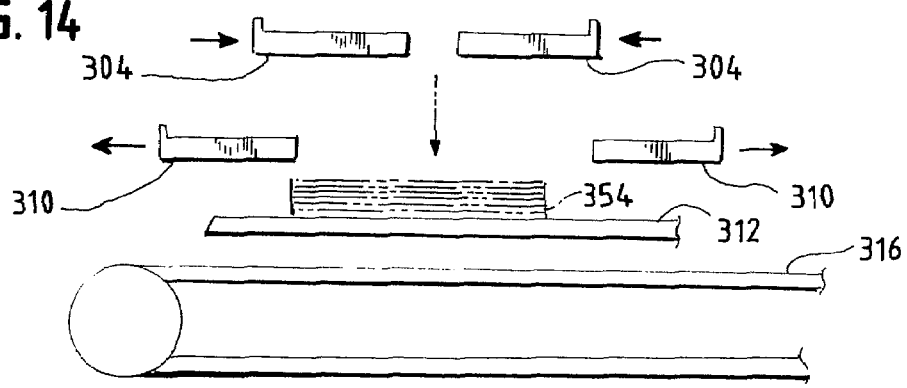
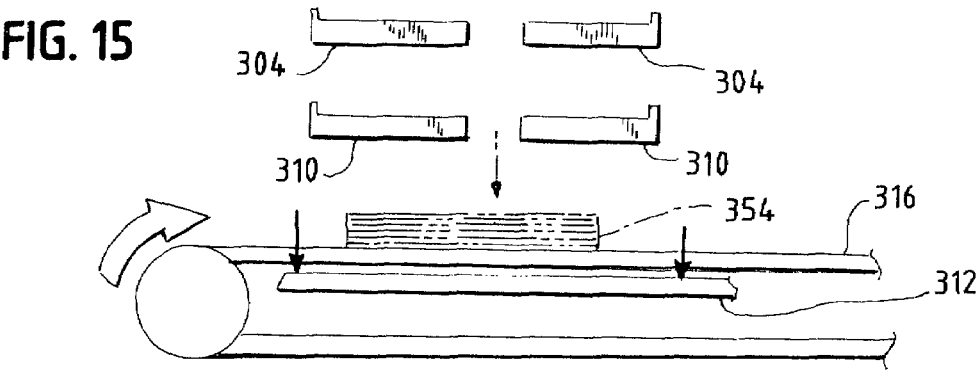

FOOD PRODUCT CONVEYOR AND HANDLING SYSTEMS

FIELD

This disclosure relates generally to food product conveyor and handling systems, and more specifically to automated conveyor systems for handling and stacking food products.

BACKGROUND

For many types of sliced food products, customers prefer to purchase the food product in packages containing a specific slice count, rather than weight. Packaging sliced food products by weight does not allow a customer to reliably determine the number of slices of a given product that are contained in the package. The number of slices will fluctuate depending on a variety of factors, such as the thickness and length of the sliced food product. Purchasing sliced food products by slice count can allow a customer to consistently determine the number of units of a given food product in a package. In addition, customers frequently prefer to have the sliced food products assembled in groups of a predetermined quantity. The predetermined quantity is often dictated by the needs or end use of a particular customer. Assembling the food product slices into groups of a predetermined quantity, therefore, can be preferable.

To achieve these objectives, a food product mass is generally sliced into food product slices, with the food product slices assembled, for example, on a carrier sheet in groups of a predetermined quantity. Frequently, the food product mass will not yield an even number of groups of the predetermined quantity. As a result, the last group that is sliced and assembled from the food product mass will frequently be incomplete and contain less than the predetermined quantity of slices. For example, a slab of bacon may yield 120 slices of bacon that is to be grouped in predetermined quantities of nine. Thus, there will be three slices of bacon that are not part of the groupings of nine. At this point, three options are generally available. The incomplete carrier sheet can be retained and assembled with the remaining complete carrier sheets. Retaining the incomplete carrier sheets may be a viable option for packages sold by weight. For customers preferring to purchase food products by a specific slice count, however, this option disrupts the ability of the customer to receive an accurate slice count for the package of sliced food products. Alternatively, the incomplete carrier sheet can be discarded, even though it contains good quality food product slices. As a result, the food product slices on the carrier sheet are then wasted. In the aggregate, such waste can be quite costly. Finally, the incomplete carrier sheet can be completed by hand placement of the necessary quantity of the sliced food product onto the incomplete carrier sheet. However, such manual manipulation can be time consuming and costly.

Another concern in the packaging of sliced food products is the speed at which a conveyor system can operate to slice, assemble, and stack the sliced food products. The stacking step is generally the slowest and, therefore, can be the limiting step in the speed of the process. A variety of stacking systems exist, with one example of a stacking system including a series of paddles that collect the sliced food products and then rotate to each side to stack the sliced food products. The rotary motion of the paddle system increases the distance the group of stacked food products must fall to create a stack of sliced food products, with the increased fall distance thereby increasing the time needed to stack the food products. As a result, the stacking step often comprises the most time consuming portion of the conveyor system, thereby limiting the speed of the entire system. A stacking system that is able to stack sliced food products at a greater rate of speed will allow the slicer to slice at an increased rate and allow the conveyors to move at an increased speed, to thereby allow the entire conveyor system to operate at an increased rate to increase production.

SUMMARY

A conveyor and handling system for assembling and stacking sliced food products is disclosed. The conveyor and handling system includes an assembly area in which sliced food products are deposited onto discrete carrier sheets. The assembly area includes an upstream conveyor for transporting a plurality of sliced food products from a slicer. The carrier sheets support a predetermined quantity of the sliced food products, with the upstream conveyor depositing the sliced food products on the carrier sheet. A downstream conveyor receives the carrier sheet, such as from a carrier sheet unwind and cutting station, supports the carrier sheet when the sliced food product is being deposited thereon, and advances the carrier sheet once the predetermined quantity has been reached. The downstream conveyor has an operative mode of operation and a paused mode of operation. The downstream conveyor operates in the paused mode when the carrier sheet contains less than the predetermined quantity of sliced food products. The downstream conveyor operates in the operative mode of operation when the carrier sheet contains the predetermined quantity of sliced food products to advance the carrier sheet.

To determine if the carrier sheet contains the predetermined quantity of sliced food products, a slicer control system calculates the total number of slices a food product mass can yield. As the slicer slices the food product mass into groups of the predetermined quantity, the slicer control counts the slices to determine the number of slices in the last group sliced from the food product mass. If the last group is incomplete and contains less than the predetermined amount, the incomplete group of slices is deposited on a carrier sheet, with the downstream conveyor in the paused mode of operation because a group of less than the predetermined quantity has been deposited on the carrier sheet. The slicer control system tracks the number of slices that are required from the subsequent food product mass to create a complete group having the predetermined quantity. The remaining slices will then join the incomplete group on the carrier sheet to form a group of the predetermined quantity, thus causing the downstream to switch to operative mode. As a result of this assembly system deposit system, each carrier sheet will contain the same predetermined quantity or number of slices, which provides for a more precise slice count for a stack of sliced food products. In addition, incomplete carrier sheets are reduced, thus limiting the waste previously created by the rejection of all incomplete carrier sheets.

A series of sensors are positioned throughout the conveyor system. The sensors detect a variety of parameters and identify irregularities in the quantity and positioning of the sliced food products on or before the sliced product is placed on a carrier sheet. By one approach, if the sensors detect the group is longer then the carrier sheet can accommodate, an attempt may be made to fit the group on the carrier sheet. If the sensors detect an irregularity or defect on the carrier sheet, such as when the sliced food product is mispositioned on the carrier sheet, the carrier sheet can be diverted from its normal transport conveyor path to a bypass conveyor using a moveable diverter conveyor in a reject area of the conveyor and handling system. The bypass conveyor is located above the transport conveyor and is spaced from the transport conveyor so as to not interfere with non-rejected carrier sheets traveling down the transport conveyor. The diverter conveyor is located below the transport conveyor and has an initial lowered position below the transport conveyor to allow non-rejected carrier sheets to continue down the transport conveyor. If a sensor determines a carrier sheet should be rejected for an irregularity, the diverter conveyor moves to a raised position to extend over the space between the transport conveyor and the bypass conveyor to link the conveyors and allow the rejected carrier sheet to move from the transport conveyor to the bypass conveyor.

The conveyor and handling system also includes a stacking area. The stacking area includes a nose conveyor having an initial extended position. As a carrier sheet approaches the end of the nose conveyor, the nose conveyor retracts to a retracted position to cause the carrier sheet to slide off of the nose conveyor. The carrier sheet is deposited on a pair of initial supports configured to reciprocate away from each other in opposing directions transverse to a downstream feed direction of the nose conveyor. The nose conveyor then extends to the extended position to deposit another carrier sheet on the pair of initial supports. The initial supports reciprocate away from each other each time the nose conveyor deposits a carrier sheet onto the initial supports. The quick motion of the extending and retracing nose conveyor and the reciprocating initial supports allows the carrier sheets of sliced food products to be stacked at an increased speed. As the stacking is generally a limiting factor in the speed of a slicing and stacking conveyor system, when the stacking speed is increased the speed of the entire system is increased, thereby potentially resulting in increased operation speeds of the system.

The initial supports reciprocate away from each other to deposit the carrier sheets onto a pair of accumulating supports positioned below the initial supports. The accumulating supports reciprocate away from each other in opposing directions at predetermined intervals. For example, the accumulating supports may reciprocate away from each other after three carrier sheets have been accumulated thereon. When the accumulating supports shift away from each other to form a gap through which the carrier sheets can fall, the carrier sheets are deposited onto a receiving platform positioned below the accumulating supports. The distance between the accumulating supports and the receiving platform increases with the number of carrier sheets on the receiving platform, with the platform eventually recessing below a conveyor to deposit a stack of accumulated carrier sheets onto an exit conveyor.

BRIEF DESCRIPTION OF THE DRAWINGS

FIG. 2 is a side view of an assembly area of the conveyor assembly;

FIG. 3 is a perspective view of the assembly area of FIG. 2 showing complete groups having a predetermined quantity of sliced food products being deposited on carrier sheets;

FIG. 4 is a perspective view of the assembly area of FIG. 2 showing an incomplete group of sliced food products being deposited on carrier sheets;

FIG. 11 comprises a perspective view of the stacking area of the conveyor and handling system showing carrier sheets on the initial supports, the accumulating supports and the receiving platform;

FIG. 12 comprises an end view of the stacking area of the conveyor and handling system showing the initial position of the initial supports, the accumulating supports and a receiving platform;

FIG. 13 comprises an end view of the stacking area of the conveyor and handling system showing the initial supports in a retracted position;

FIG. 14 comprises an end view of the stacking area of the conveyor and handling system showing the accumulating supports in a retracted position; and FIG. 15 comprises an end view of the stacking area of the conveyor and handling system showing the receiving platform depositing the carrier sheets on the exit conveyor.

DETAILED DESCRIPTION

Various embodiments of a conveyor assembly apparatus and method in accordance with the above-discussed aspects are illustrated in FIGS. 1-15 herein. Generally, a conveyor system is provided for slicing and stacking sliced food products. The conveyor system includes a slicer, wherein a food product mass is sliced into a plurality of discrete sliced food products. The sliced food products then proceed to an assembly area, where the sliced food products are deposited in groups of a predetermined amount on food carrier sheets. The assembly area is configured to assemble the sliced food products such that each carrier sheet contains the same predetermined quantity, thereby providing a more precise slice count for a stack of sliced food products. The carrier sheets containing the sliced food products then proceed to a stacking area, with defective carrier sheets being diverted to a bypass conveyor before reaching the stacking area. The stacking area includes a nose conveyor that extends and retracts to deposit the carrier sheets on a pair of supports that reciprocate away from each other each time the nose conveyor deposits a carrier sheet, thereby allowing the carrier sheets of sliced food products to be stacked at an increased speed.

Figure 1:
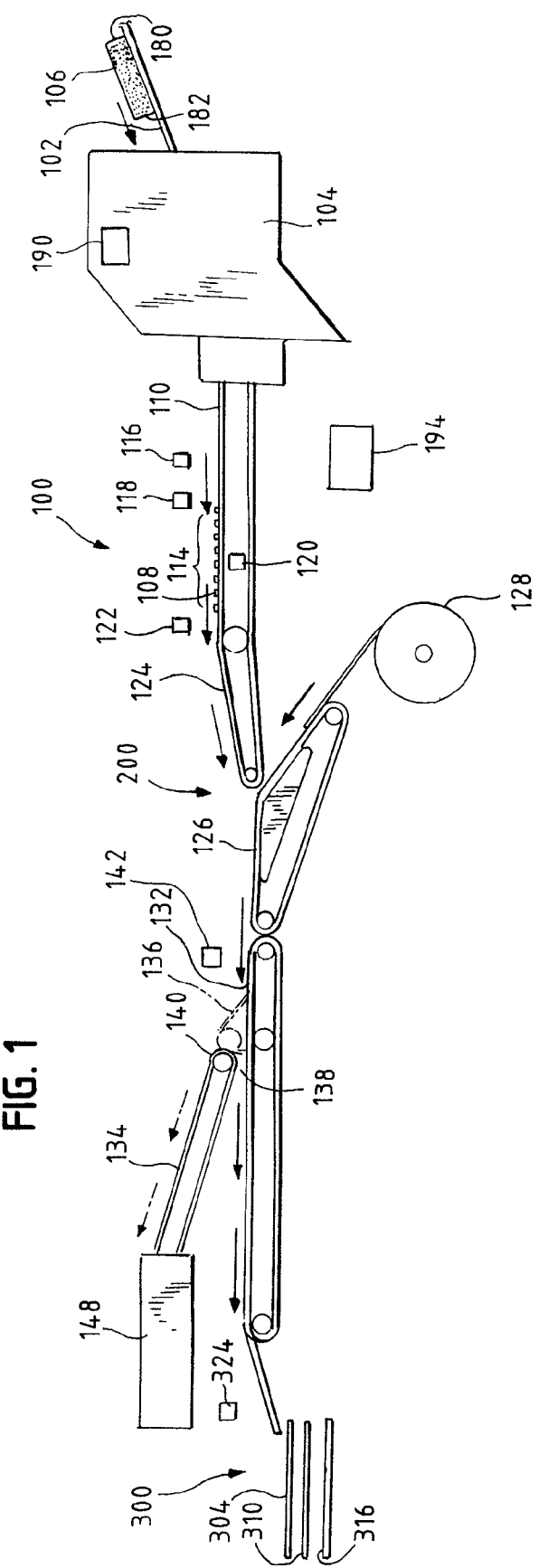
FIG. 1 is a schematic side view of a conveyor and handling system.

Referring to FIG. 1, a side view of a conveyor assembly system 100 is shown. A food product mass 106 is loaded into a slicer 104 via an infeed conveyor 102. The food product mass 106 may comprise, for example, a pork belly, or any other type of sliceable food product mass. The food product mass 106 may be chilled to a suitable temperature, if necessary, for slicing of the food product mass 106. For example, a pork belly may be sliced when the pork belly has a temperature range of 20-28 degrees Fahrenheit. The slicer 104 may be any type of commercial slicer known in the art, such as, for example, an IBS2000 Vision Slicer produced by AEW Delford Systems. The slicer 104 slices the food product mass 106 into a plurality of discrete sliced food products 108. In the case of a pork belly, the slicer 104 would slice the pork belly into, for example, discrete slices of bacon. The slicer 104 may slice the food product mass 106 into slices of a predetermined thickness. The slicer 104 may optionally remove a portion of the front end 182 and the back end 180 of the food product mass 106, as those portions of the food product mass 106 are generally nonuniform and may produce irregularly-shaped sliced food products. A predetermined amount, such as, for example, a quarter of an inch, may be removed from the front end 182 of the food product mass 106 before slicing, with the same or a different predetermined amount being discarded at the back end 180 of the food product mass 106, such that the slices will be generally more equally shaped. As the slicer 104 slices the food product mass 106 into sliced food products 108, the sliced food products 108 are deposited onto a slicer exit conveyor 110 to exit the slicer 104.

A slicer control 190 is connected to the slicer 104 such that a blade (not shown) of the slicer 104 can be operated to slice the food product mass 106 into groups of a predetermined quantity. The groups can contain any of a number of slices. As one illustrative example, the slicer blade can rotate to slice eight discrete slices from the food product mass 106. The blade can then rotate without making a cut such that a space is inserted before the next group of slices is sliced from the food product mass. The slicer control 190 can operate the blade of the slicer 104 to slice the food product mass 106 into groups of any desired amount. The group of sliced food products 114 then exits the slicer 104 on a slicer exit conveyor 110. The sliced food products 108 may be assembled in groups wherein each sliced food product 108 within the group is separated from an adjacent sliced food product 108 by a space, such as shown in the group of sliced food products 114 in FIG. 1. By another optional approach, the group of sliced food products 114 may be shingled, such that adjacent sliced food products 108 overlap.

As each group of sliced food products 114 travels down the slicer exit conveyor 110, the group of sliced food products 114 may be manually inspected for any irregularities. In addition, the group of sliced food products 114 may move past a series of sensors that can detect a variety of parameters and identify other irregularities. Preferably, optic sensors are used in this application, although other types of sensors as known in the art may be used in any of a variety of configurations to measure a plurality of parameters. For example, a first set of optic sensors 116 may detect whether the group of sliced food product 114 is too wide and a second set of optic sensors 118 may detect whether the group of sliced food products 114 is too long. A third set of optic sensors 120 may be located below the belt plane of the slicer exit conveyor 110 to determine if any portion of a sliced food product 108 is hanging off of the slicer exit conveyor 110.

The group of sliced food products 114 exits the slicer 104 and travels toward an assembly area 200 of the conveyor system 100. The group of sliced food products 114 travels down the slicer exit conveyor 110 and proceeds down a ramp conveyor 124 toward a deposit conveyor 126, as shown in FIGS. 2 and 3. Before reaching the ramp conveyor 124, a fourth set of optic sensors 122 (FIG. 1) may register a leading edge of the group of sliced food products 114 such that the group of sliced food products 114 can be properly aligned and timed for deposit on a carrier sheet 112, as described below.

As the group of sliced food products 114 approaches the deposit conveyor 126, a carrier sheet roll 128 is fed onto the deposit conveyor 126. The carrier sheet roll 128 is cut into discrete carrier sheets 112 by a rotating and adjustable die, with the carrier sheets 112 sized to support the group of sliced food products 114. The preferred width and length of the carrier sheet 112 may be determined by the average width and length of the sliced food product 108. As shown in FIGS. 2 and 3, the group of sliced food products 114 is shown on the ramp conveyor 124 approaching the end 130 of the ramp conveyor 124. An end portion 131 of the carrier sheet roll 128 is advancing toward the end 130 of the ramp conveyor 124, with the end portion 132 being cut to form a discrete carrier sheet 112 as it approaches the end 130 of the ramp conveyor 124. The discrete carrier sheet 112 is then advanced on the deposit conveyor 126 to a position under the end 130 of the ramp conveyor 124 and continues to advance such that the carrier sheet 112 arrives at a position close to or just beyond the end 130 of the ramp conveyor 124 as the group of sliced food products 114 is also approaching the end 130 of the ramp conveyor 124. The group of sliced food products 114 is then deposited on the discrete carrier sheet 112 by the ramp conveyor 124, as shown in FIG. 3.

The conveyors may be of any type suitable for food handling and the system may be comprised of all the same type of conveyor or of a combination of different types of conveyors. For example, the deposit conveyor 126 may optionally contain a vacuum belt conveyor portion to orient and maintain the carrier sheet on the belt, particularly before and as the group of sliced food products 114 is deposited on the carrier sheet. Other conveyors in the conveyor system 100, such as the slicer exit conveyor 110 and the ramp conveyor 124 are comprised of a series of evenly spaced conveyor strips 192.

Frequently, the food product mass 106 will not yield an even number of groups of the sliced food products 114 of the predetermined quantity. There are often a leftover number of slices at the end of the slicing of the food product mass 106 that do not form a complete group. To form a complete group, and to avoid wasting the leftover slices, the number of slices that can be obtained from a food product mass 106 can be calculated by the slicer control. The length of the entire food product mass is measured by a sensor in the slicer and communicated to the slicer control 190. Taking into account the predetermined length that will be trimmed from the front end 182 and the back end 180 of the food product mass 106 and the width of each slice, the number of slices that the food product mass 106 will yield can then be determined. The slicer control 190 can then calculate the number of complete groups of the predetermined quantity that can be formed from the total number of slices and whether there will be leftover slices. The slicer control 190 is in communication with a controller 194, the controller 194 also being in communication with the deposit conveyor 126 downstream of the slicer exit conveyor 110. When the slicer control 190 detects that an incomplete group of sliced food products is exiting the slicer 104, the incomplete group is deposited on a carrier sheet 112 on the deposit conveyor 126 and the slicer control 190 communicates to the controller 194 that an incomplete group has been formed. The set of sensors 118 measuring the length of the group of sliced food products 114 may also measure the length of the incomplete group to determine if the incomplete group of food products contains approximately the number of slices as projected by the calculations of the slicer control 190. The controller 194 then communicates with the deposit conveyor 126 to delay advancement of the deposit conveyor 126 such that the carrier sheet 112 carrying the incomplete group is held in place with the deposit conveyor 126 in a paused mode of operation at the end of the ramp conveyor 124.

Referring to FIG. 4, an incomplete group of five sliced food products 186 is shown on a carrier sheet 112, with the deposit conveyor 126 in a paused mode of operation such that the carrier sheet 112 remains at the end 130 of the ramp conveyor 126 until additional slices are provided to complete the grouping on the carrier sheet 112. The slicer control 190 has determined the number of slices in the incomplete group, and therefore knows the number of slices needed to complete the group. The slicer control 190 then communicates to the slicer 104 the number of slices that need to be cut from a subsequent food product mass to create the complete group. After optionally slicing off the predetermined rejected amount from the front of the subsequent food product mass, the slicer 104 will then slice the number of slices necessary to complete the group.

The remaining slices then travel down the slicer exit conveyor 110 and down the ramp conveyor 124 and are deposited on the carrier sheet 112 containing the incomplete group to thus form a complete group of the predetermined quantity. Referring again to FIG. 4, the remaining three slices 188 are traveling down the ramp conveyor 124, with the remaining slices 188 advancing to join the grouping of five slices 186 to form a complete group on the carrier sheet 112. As the remaining three slices 188 advance down the ramp conveyor 124, the ramp conveyor 124 extends forward over the paused carrier sheet 112 containing the group of five sliced food products 186 to compensate for the movement of the carrier sheet 112 before the carrier sheet 112 pauses to receive the remaining slices 188. The ramp conveyor 124 extends such that the end 130 of the ramp conveyor 124 is generally aligned behind the last trailing food product 194 of the group of five slices 186. As a result, the remaining three slices 188 will be deposited on the carrier sheet 112 following the five slices 186 in the empty trailing end region 196 of the carrier sheet 112 to form a complete and aligned group of sliced food products. The ramp conveyor 124 then returns to its original position as the next group of sliced food products approaches.

The slicer control 190 communicates to the controller 194 that the remaining slices have been provided and, once deposited, the controller 194 then communicates with the deposit conveyor 126 to switch the conveyor 126 from the paused mode of operation to an operative mode of operation. The now complete group of sliced food products 114 continues to travel down the deposit conveyor 126. The cycle then repeats itself, with the subsequent food product mass being sliced into groupings of the predetermined quantity until a grouping of less than the predetermined quantity can be formed, with another subsequent food product mass then completing the next incomplete group. As a result of this assembling system, each carrier sheet will have a complete group of sliced food products, thereby allowing for determination of a precise slice count.

Figure 5:
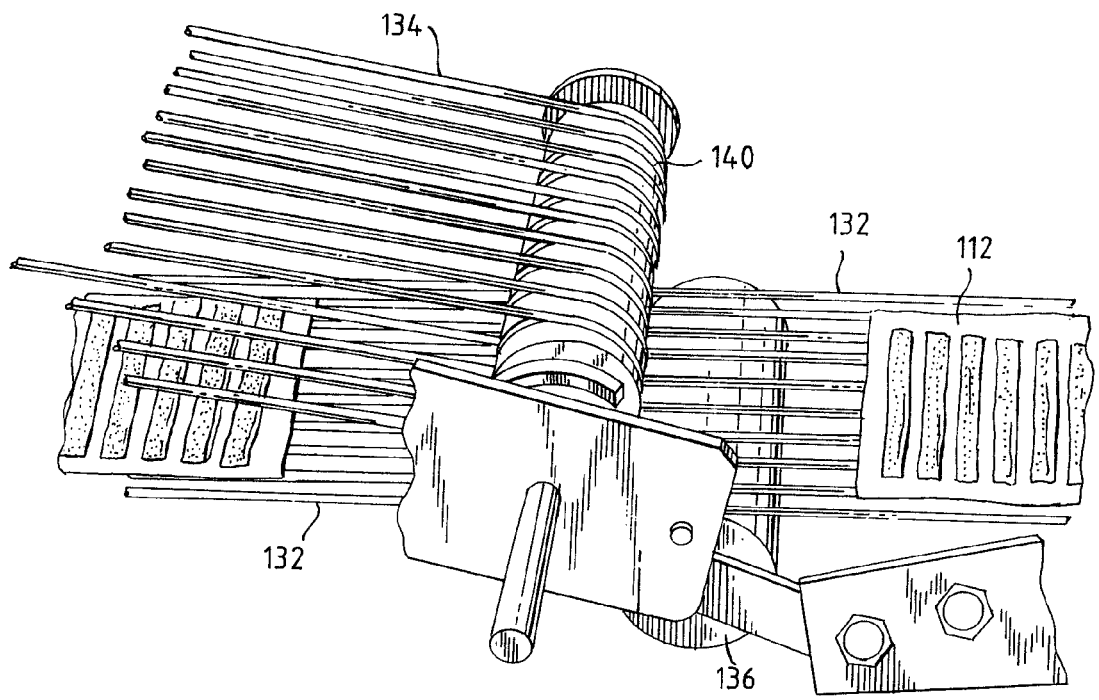
FIG. 5 is a perspective view of the reject area of the conveyor and handling system of FIG. 1 showing a diverting conveyor in a lowered position.
Figure 6:
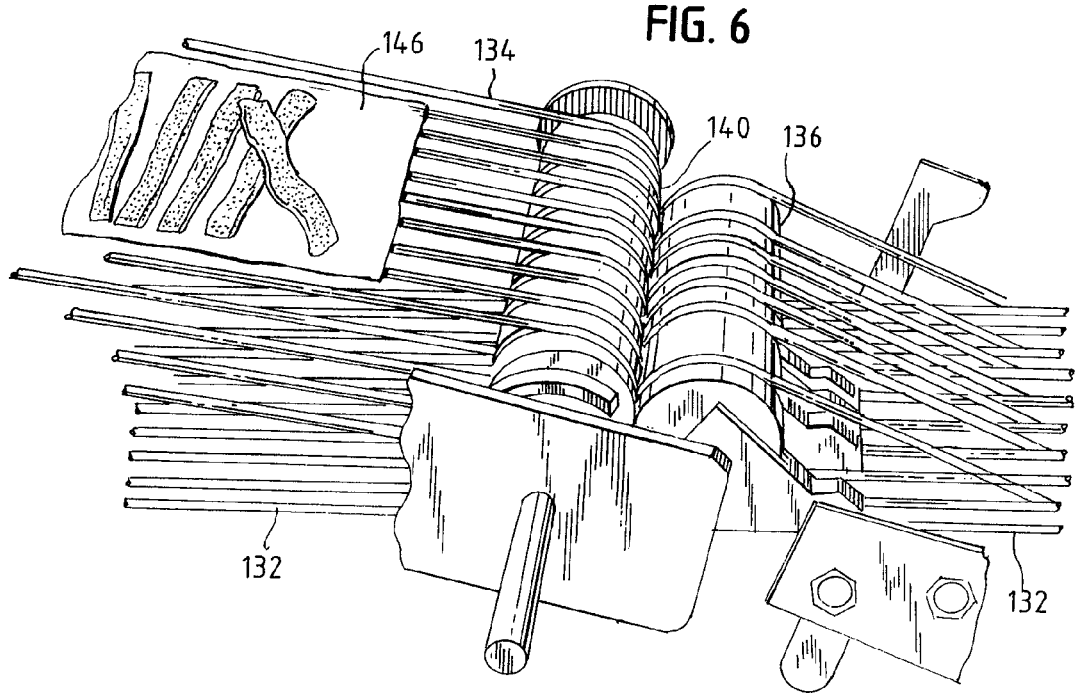
FIG. 6 is a perspective view of the reject area of the conveyor and handling system showing the diverting conveyor in a raised position.

As the carrier sheet 112 now contains the group of sliced food products 114, it shall be understood that reference to an action of the loaded carrier sheet 112 also generally refers to an action of the sliced food products 108 as they travel on the carrier sheets 112, and vice versa. The carrier sheet 112 containing the group of sliced food products 114 continues to travel down the deposit conveyor 126 and onto a transport conveyor 132. If one of the earlier sensors 116, 118, or 120 detects an irregularity in the group of sliced food products 114, the carrier sheet 112 containing that group may be rejected. Referring now to FIGS. 5 and 6, a bypass conveyor 134 is located adjacent the transport conveyor 132 for receiving rejected food products. The bypass conveyor 134 is positioned at an angle to the transport conveyor 132, with a gap 138 between a lower end 140 of the bypass conveyor 134 and the transport conveyor 132 (FIG. 5). A diverting conveyor 136 functions to connect the lower end 140 of the bypass conveyor 134 and the transport conveyor 132 in the case of a rejected carrier sheet of food products 108. The diverting conveyor 136 operates in a lowered position recessed below the transport conveyor 132, as shown in FIG. 5, to allow any nonrejected food products to continue to travel down the transport conveyor 132 and under the bypass conveyor 134 towards a stacking area 300. If one of the earlier sensors detects an irregularity in the group of sliced food products 114, the controller 194 tracks the location of the irregular carrier sheet and communicates with a fifth set of optic sensors 142 to detect a leading edge of the carrier sheet that is to be rejected. Once the optic sensor 142 detects the leading edge, the diverting conveyor 136 moves to a raised position, as shown in FIG. 6, to close the gap 138 and to connect the bypass conveyor 134 to the transport conveyor 132 to thereby divert the rejected carrier sheet 146 to the bypass conveyor 134. The rejected carrier sheet 146 then travels down the bypass conveyor 134 and into a reject area 148 such as, for example, a reject table or bin, as shown in FIG. 1.

The non-rejected carrier sheets continue to travel down the transport conveyor 132 toward a stacking area 300. The carrier sheets 112 advance in a downstream direction down the transport conveyor 132 and onto a nose conveyor 302. Referring now to FIGS. 7-15, the nose conveyor 302 includes a conveyor portion 306 connected to a flat inclined portion 308, with the nose conveyor 302 being configured to extend and retract over a pair of initial supports 304. The initial supports 304 are positioned at the end of the nose conveyor 302, with the initial supports 304 being oriented parallel to each other in a horizontal plane. The initial supports 304 are configured to linearly reciprocate away from each other in opposing directions transverse to the downstream direction of the carrier sheet 112.

A pair of accumulating supports 310 are positioned below the initial supports 304, with the accumulating supports 310 also being configured to linearly reciprocate away from each other in opposing directions transverse to the downstream direction of the carrier sheet 112. A receiving platform 312 is positioned below the accumulating supports 310. The receiving platform 312 includes a plurality of extensions 314 oriented in a horizontal plane, although other orientations may be contemplated. The receiving platform 312 is configured to move up and down in a vertical direction. An exit conveyor 316 comprised of a plurality of conveyor strips or bands 318 is positioned below the receiving platform 312, and the extensions 314 of the receiving platform 312 are positioned such that they can move vertically through the space 320 between adjacent conveyor strips 318 of the exit conveyor 316 to allow the receiving platform 312 to recess below the exit conveyor 316.

Figure 7:
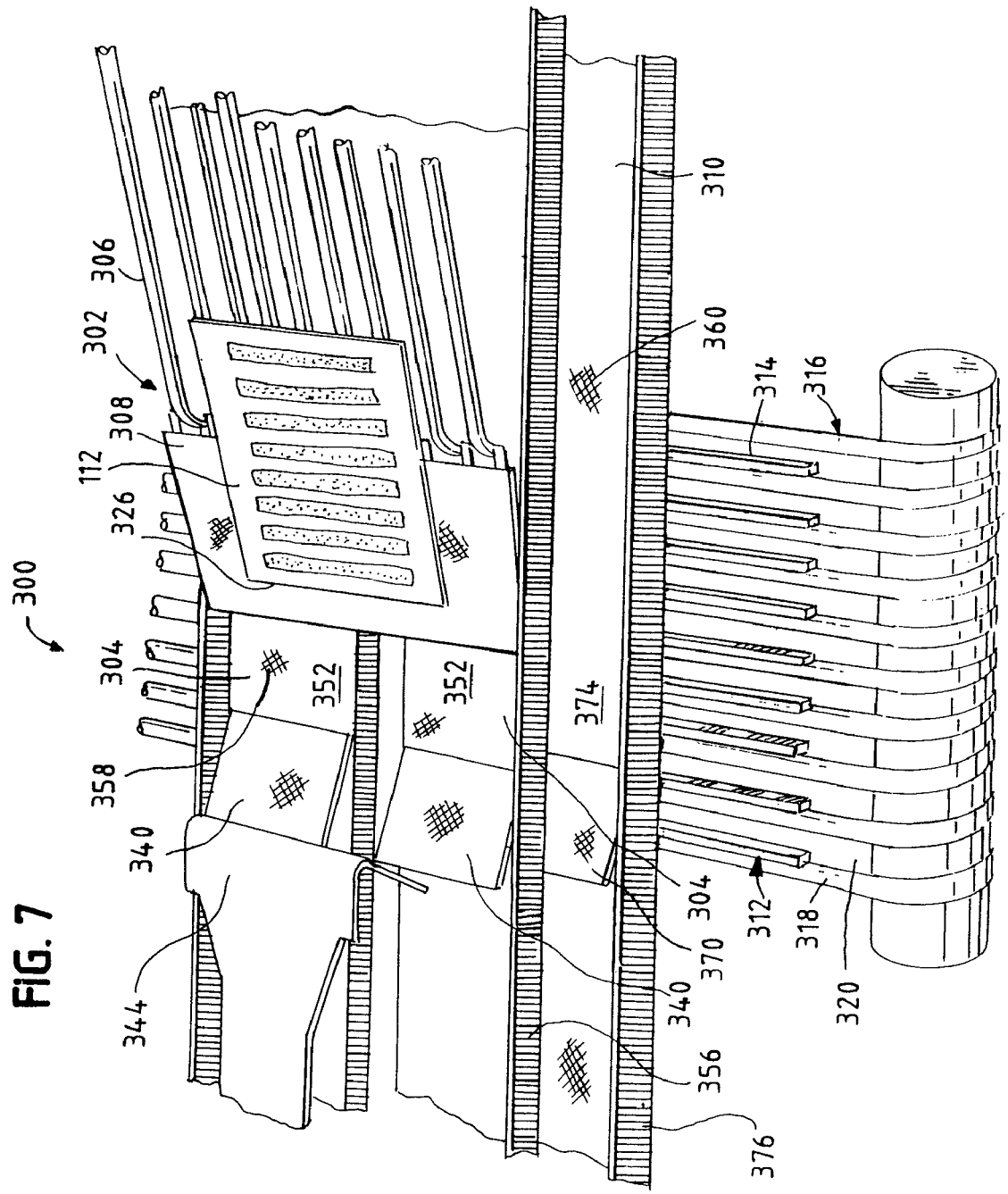
FIG. 7 comprises a perspective view of a stacking area of the conveyor and handling system showing the nose conveyor in an initial extended position.
Figure 8:
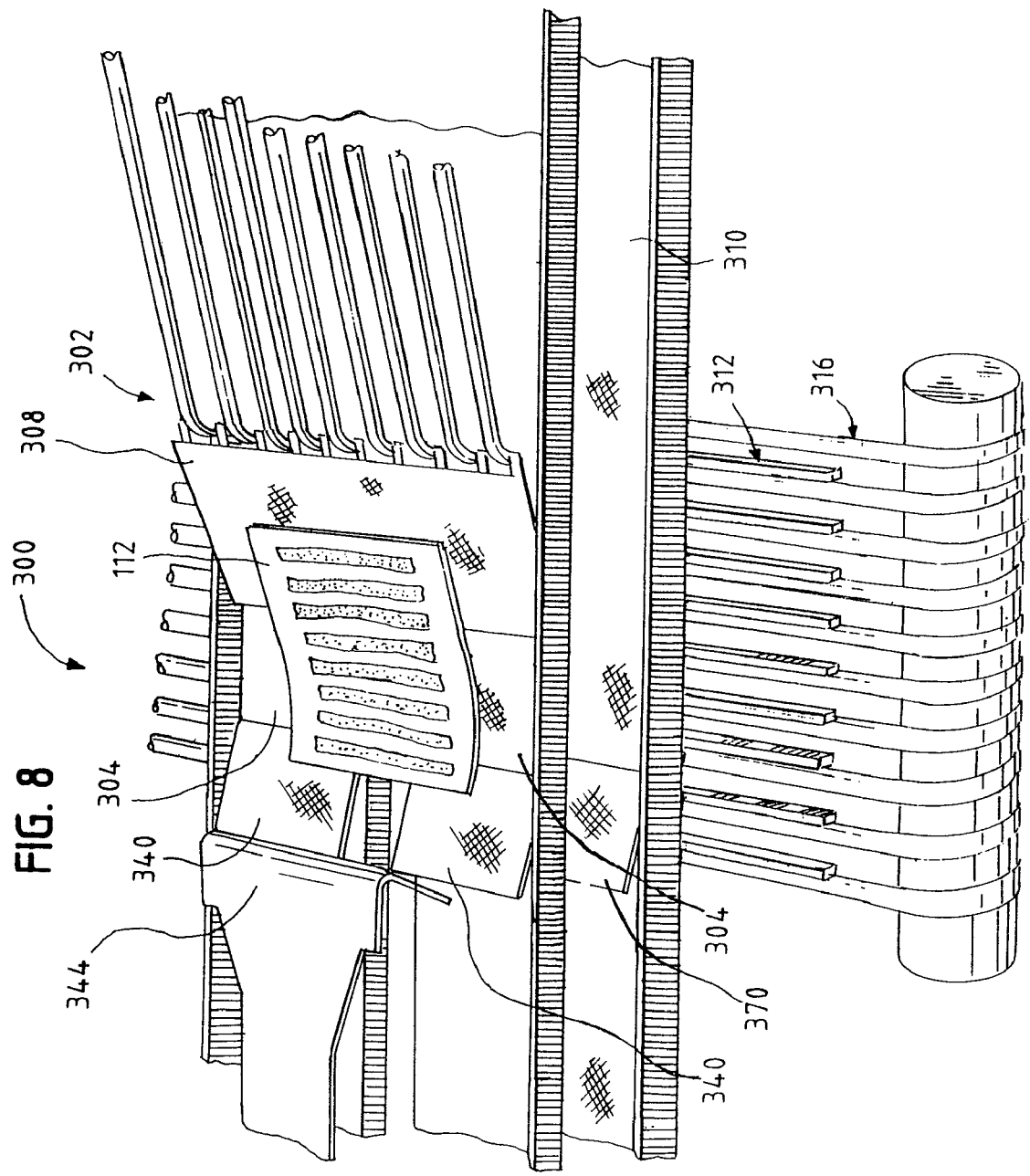
FIG. 8 comprises a perspective view of the stacking area of the conveyor and handling system showing the nose conveyor retracting and depositing the carrier sheet on initial supports.
Figure 9:
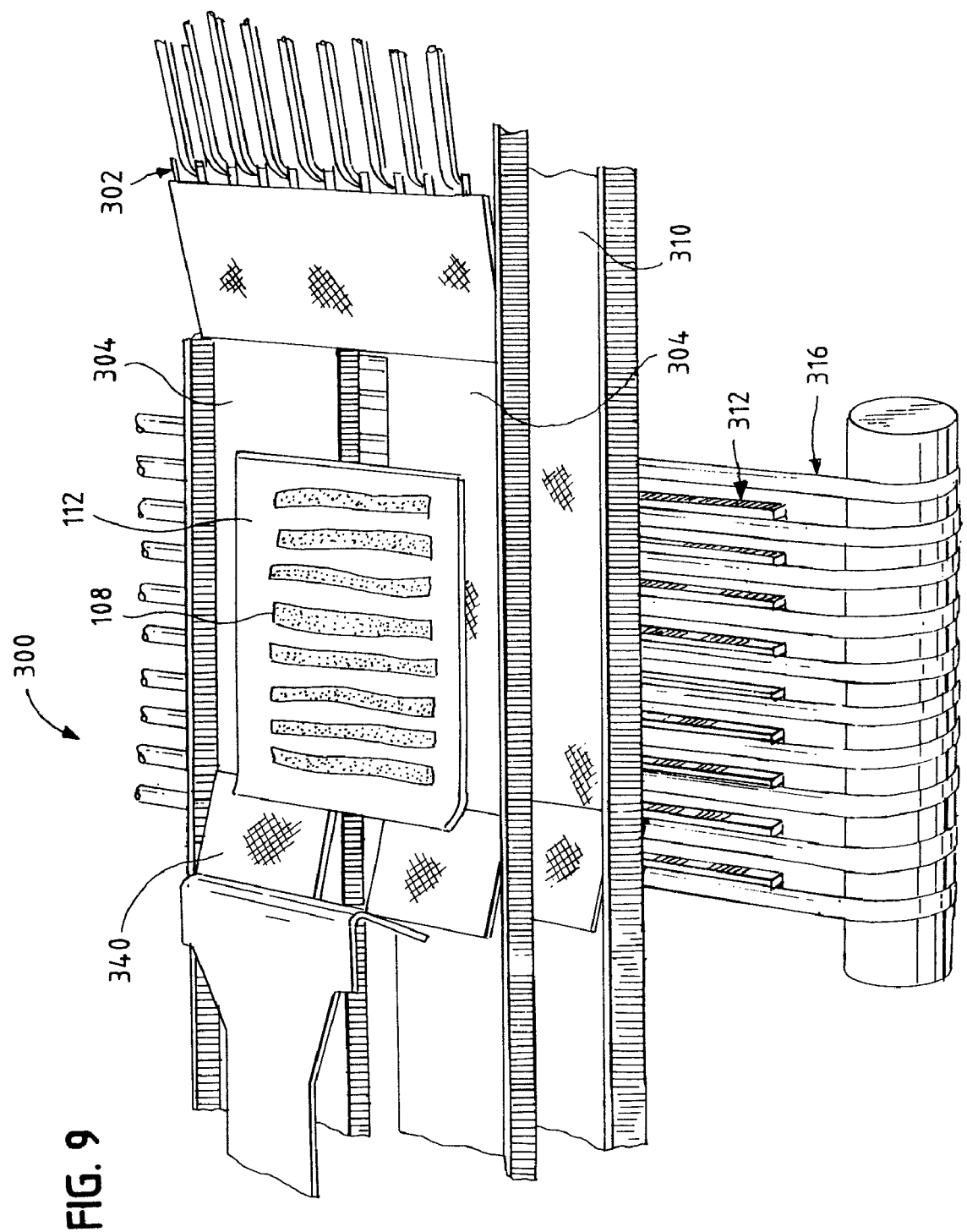
FIG. 9 comprises a perspective view of the stacking area of the conveyor and handling system showing the nose conveyor in a retracted position after depositing the carrier sheet on the initial supports.

As shown in FIG. 7, the nose conveyor 302 has an initial position extended over the initial supports 304. A sixth set of sensors 324 (FIG. 1) registers the leading edge 326 of the carrier sheet 112 as it approaches the nose conveyor 302. As the leading edge 326 of the carrier sheet 112 is detected by the sixth set of sensors 324, the nose conveyor 302 begins to retract such that the carrier sheet 112 begins to slide off of the inclined portion 308 of the nose conveyor 302 and onto a floor portion 352 of the initial supports 304, as shown in FIG. 8. The carrier sheet 112 is then fully deposited on the initial supports 304, as shown in FIG. 9. Each initial support 304 contains an upwardly inclined segment 340 on an end portion thereof. The upwardly inclined segments 340 serve to slow the carrier sheet 112 as it slides off of the nose conveyor 302 and is deposited on the initial supports 304 such that the carrier sheet does not slide beyond its intended position in a central region of the initial supports 304. In addition, a backstop 344 is positioned above the end portion of the pair of initial supports and generally adjacent the upwardly inclined segments. The backstop 344 also serves to limit travel of the food product in the downstream direction as the carrier sheet 112 slides off of the nose conveyor 302. The initial supports 304 have outer side walls 356 extending generally transverse to the floor portion 352 of the initial supports 304. The floor portion 352 includes a plurality of raised segments 358 to support the carrier sheet 112 containing the sliced food products 108 above a bottom surface of the floor portion 352 of the initial supports 304. The initial supports 304 support lateral edges of the sliced food products 108, with the lateral edges of the sliced food products 108 being supported indirectly by the carrier sheet 112 being used to support and transport the sliced food products 108.

Figure 10:
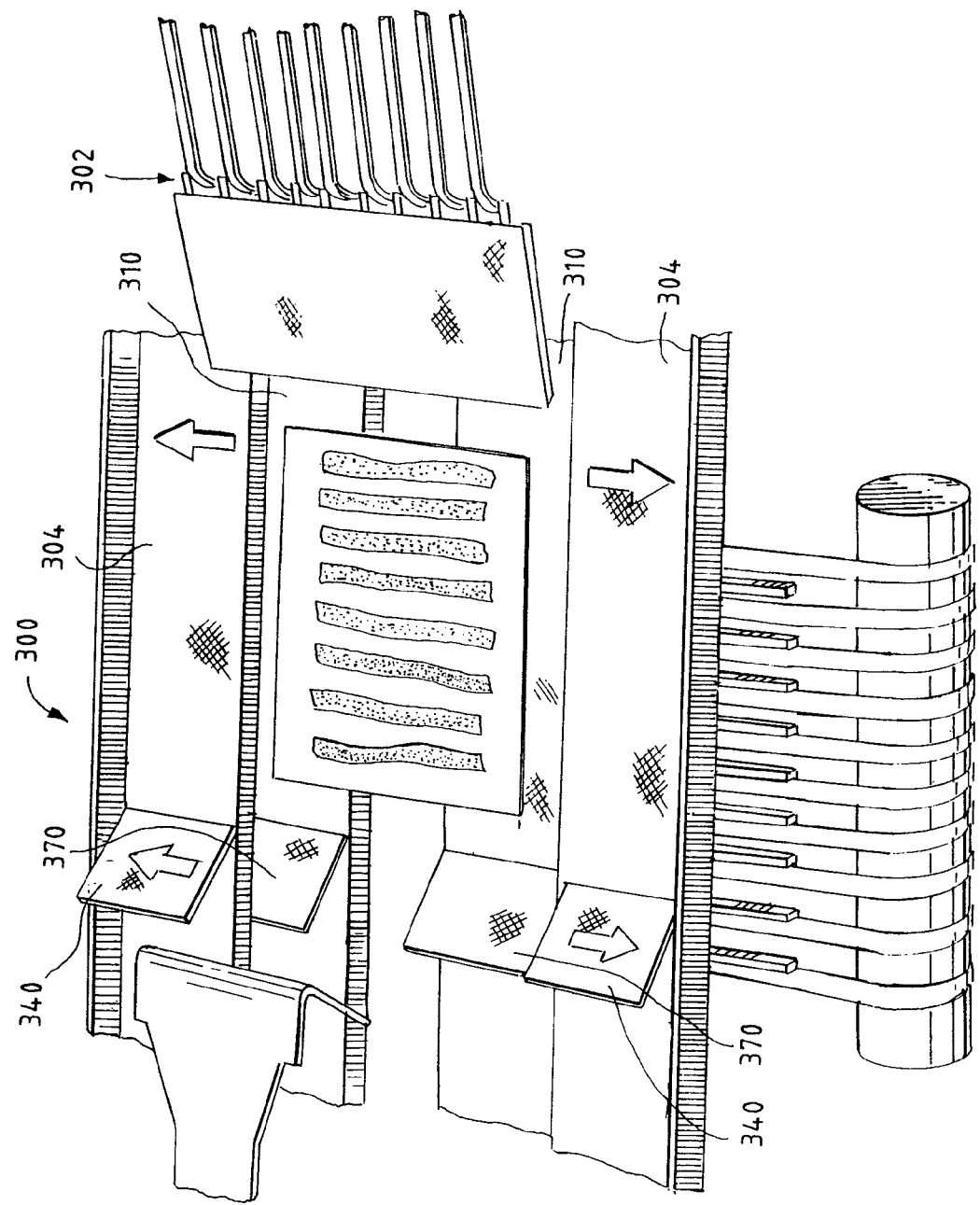
FIG. 10 comprises a perspective view of the stacking area of the conveyor and handling system showing the initial supports reciprocating away from each other to permit the carrier sheet to fall to accumulating supports.

As the nose conveyor 302 retracts, the initial supports 304 move linearly away from each other to form a gap through which the carrier sheet 112 containing the sliced food products 108 may fall. As shown in FIG. 10, the initial supports 304 are in a fully retracted position and the carrier sheet 112 has fallen onto the accumulating supports 310 positioned below the initial supports 304. After the carrier sheet 112 falls onto the accumulating supports 310, the initial supports 304 then move linearly toward each other back to the original position. The next carrier sheet then begins to travel down the nose conveyor 302 and the nose conveyor will move from the retracted position back to the initial extended position of FIG. 7 to deposit the next carrier sheet on to the initial supports 304, with the process repeating for each carrier sheet. The nose conveyor 302 retracts and extends for every carrier sheet that travels down the transport conveyor, with the initial supports 304 reciprocating in opposing directions after every carrier sheet is deposited thereon to allow the carrier sheet 112 to fall onto the accumulating supports 310.

As mentioned, the accumulating supports 310 are configured to reciprocate away from each other in opposing directions at predetermined intervals. The initial supports 304 reciprocate after every carrier sheet deposit, but the accumulating supports 310 may reciprocate at a less frequent interval. For example, the accumulating supports 310 may reciprocate after every third carrier sheet is deposited on the accumulating supports 310. As shown in FIG. 14, the accumulating supports 310 will then move apart in opposing directions to form a second gap through which the grouping of three carrier sheets will fall and then land on the receiving platform 312 below, as shown in FIG. 15. The accumulating supports 310 will then move back together to the original position to allow for accumulation of the next grouping of three carrier sheets. Any grouping or interval of carrier sheets may be chosen. As with the initial supports 304, the accumulating supports 310 may have an upwardly inclined segment 370 on each support to ensure that the carrier sheet 112 does not slide off of the accumulating support 310. In addition, the accumulating supports 310 may have a plurality of raised segments 360 to support the carrier sheet 112 containing the sliced food products 108 above a bottom surface of a floor portion 374 of the accumulating supports 310. The accumulating supports 310 have outer side walls 376 extending generally transverse to the floor portion 374 of the accumulating supports.

The receiving platform 312 collects the carrier sheets 112 of food products after the carrier sheets 112 have fallen from the accumulating supports 310. The distance between the accumulating supports 310 and the receiving platform 312 increases with the amount of food product on the receiving platform 312. The receiving platform 312 acts as an elevator and starts at an initial position near the accumulating supports 310, with the platform 312 being free of carrier sheets 112. As a first grouping of carrier sheets drops from the accumulating supports 310, the receiving platform 312 receives the grouping and then increases the distance between the accumulating supports 310 and the receiving platform 312. The receiving platform 312 continues to increase the distance between the platform 312 and the accumulating supports 310 with each grouping of carrier sheets that falls onto the platform. Eventually, after a predetermined number of groupings have been collected on the receiving platform 312, the extensions 314 comprising the receiving platform 312 will move into the space 320 between the strips 318 of the exit conveyor 316 such that the carrier sheets 112 of food products will be deposited on the exit conveyor 316. The exit conveyor 316 can then advance to move the stack of carrier sheets 112 off of the conveyor system 100 and into a packaging or other area. Once the exit conveyor 316 advances the stack away from a position under the accumulating supports, the receiving platform 312 will then raise back up through the space 320 between the strips 318 of the exit conveyor 316 to return to the platform's initial position to receive more carrier sheets. By one approach, the exit conveyor may advance the stack of carrier sheets and then deposit the sheets on a lift-and-turn conveyor. After the stack is deposited on the lift-and-turn conveyor, the lift-and-turn conveyor elevates a predetermined distance and turns ninety degrees. The lift-and-turn conveyor then elevates an additional predetermined distance until the lift-and-turn conveyor is level with a transfer conveyor. The stack is then advanced off of the lift-and-turn conveyor and onto the transfer conveyor.

FIG. 11 shows a side view of the stacking area 300 of the conveyor assembly 100. An end view of the stacking area 300 in an initial position is shown in FIG. 12. The initial supports 304 are shown with a carrier sheet 112 deposited thereon, before the initial supports 304 reciprocate away from each other. When the initial supports 304 shift away from each other to allow the carrier sheet 112 to fall through the gap created therebetween, the carrier sheet 112 will fall onto an accumulated stack 350 on the accumulating supports 310, as shown in FIG. 13. In this example, the accumulating supports 310 reciprocate after a stack of three carrier sheets has accumulated thereon. The accumulating supports 310 will then reciprocate away from each other to allow the accumulated stack 350 of carrier sheets to fall through the gap created therebetween, with the accumulated stack 350 falling onto a collected stack 354 of carrier sheets on the receiving platform 312, as shown in FIG. 14. The receiving platform 312 will then increase in distance from the accumulating supports 310 as each accumulated stack 350 joins the collected stack 354 of carrier sheets on the receiving platform 312. When the collected stack 354 contains a predetermined number of carrier sheets, such as, for example, nine carrier sheets, the receiving platform 312 will move to a recessed position below the exit conveyor 316 such that the collected stack 354 is deposited on the exit conveyor 316. The exit conveyor 316 then advances the collected stack 354 to a packaging or other area. The figures show illustrative configurations of the system, and the number of carrier sheets accumulating or collecting on each support level before reciprocation may be set at predetermined amounts other than those than shown or described herein.

This stacking system 300, including the nose conveyor 302, the reciprocating initial supports 304, the reciprocating accumulating supports 310, and the receiving platform 312, allows carrier sheets of sliced food products to be stacked at a faster rate. As a result, the slicer speed can be increased such that the slicer can slice the food product mass into groups of the predetermined quantity at a faster rate. The conveyor speeds can also be increased, thus increasing production. The slicer can now slice at a rate of at least 800 slices per minute, and preferably at a rate of at least 900 slices per minute or greater, with the improved stacking system 300 accommodating the increased rate.

Those skilled in the art will recognize that a wide variety of modifications, alterations, and combinations can be made with respect to the above described embodiments without departing from the spirit and scope of the invention, and that such modifications, alterations, and combinations are to be viewed as being within the ambit of the inventive concept.

The invention claimed is:

1. An apparatus for stacking food products, the apparatus comprising:
    a pair of initial supports for directly supporting lateral edges of the food product thereon each initial support including upwardly inclined segments on an end portion thereof, the pair of initial supports linearly reciprocating in opposing directions transverse to a downstream feed direction to form a gap through which the food product can fall;
    a nose conveyor directing the food product in a downstream direction toward the pair of initial supports, the nose conveyor configured to extend and retract to deposit the food product on the pair of initial supports;
    a pair of accumulating supports positioned below the initial supports to collect the food product after falling through the gap, the accumulating supports linearly reciprocating in opposing directions transverse to the downstream direction at predetermined intervals to form a second gap through which the food product can fall; and
    a receiving platform positioned below the accumulating supports to collect the food product directly thereon after falling through the second gap, the distance between the accumulating supports and the receiving platform increasing with the amount of food product on the receiving platform.

2. An apparatus for stacking food products in accordance with claim 1 further comprising discrete carriers, and a plurality of the food products being grouped together to travel on the discrete carriers, each carrier having a length less than a length of the initial support and a width less than the gap formed when the initial supports reciprocate away from each other into a fully retracted position.

3. An apparatus for stacking food products in accordance with claim 1 further comprising a backstop positioned above an end portion of the pair of initial supports to limit travel of the food product in the downstream direction.

4. An apparatus for stacking food products in accordance with claim 1 wherein the pair of initial supports and the pair of accumulating supports each include a plurality of raised segments to support the food product above a floor surface of the supports.

5. An apparatus for stacking food products in accordance with claim 1 wherein the conveyor includes a transport conveyor upstream of the nose conveyor, a bypass conveyor adjacent the transport conveyor, and a diverting conveyor being moveable between a raised position to direct the rejected food product from the transport conveyor to the bypass conveyor and a lowered position to allow a non-rejected food product to continue on the transport conveyor.

6. An apparatus for stacking food products in accordance with claim 5 further comprising a sensor adjacent the transport conveyor and upstream of the diverting conveyor to detect a predetermined parameter to determine whether a food product is rejected and diverted to the bypass conveyor.

7. An apparatus for stacking food products in accordance with claim 1 wherein the receiving platform is moveable from a first position that receives the food product thereon to a second position that is recessed below an exit conveyor to transfer the food product from the receiving platform to the exit conveyor.

8. An apparatus for stacking food products in accordance with claim 7 wherein the exit conveyor is operable to advance the food product in a direction transverse to the downstream feed direction.

9. An apparatus for stacking food products in accordance with claim 1 wherein the nose conveyor includes a conveying portion connected to a downstream, flat inclined portion.

10. A method for stacking food products, the method comprising:
    advancing a food product on a nose conveyor in a downstream direction, the nose conveyor configured to extend and retract over a pair of initial supports;
    depositing the food product from the nose conveyor directly on the pair of initial supports by extending the nose conveyor over a portion of the pair of initial supports and then retracting the nose conveyor to deposit the food product on the pair of initial supports;
    slowing the food product as it slides off of the nose conveyor and is deposited onto the pair of initial supports by providing an upwardly inclined segment on an end portion of each initial support such that the food product does not slide beyond its intended position;
    moving the pair of initial supports linearly away from each other in opposing directions transverse to the downstream direction to form a gap through which the food product can fall, the pair of initial supports moving away from each other after each deposit of the food product;
    accumulating the food product on a pair of accumulating supports below the pair of initial supports;
    moving the pair of accumulating supports linearly away from each other in opposing directions transverse to the downstream direction at predetermined intervals to form a second gap through which the food product can fall; and
    collecting the food product directly on a receiving platform positioned below the accumulating supports.

11. A method for stacking food products in accordance with claim 10 further comprising increasing the distance between the accumulating supports and the receiving platform as an amount of food product collecting on the receiving platform increases.

12. A method for stacking food products in accordance with claim 10 wherein moving the pair of initial supports away from each other in opposing directions includes moving the pair of initial supports away from each other each time the nose conveyor deposits a food product on the pair of initial supports.

13. A method for stacking food products in accordance with claim 10 further comprising detecting a predetermined parameter to determine whether the food product should be deposited onto the pair of initial supports.

14. A method for stacking food products in accordance with claim 13 further comprising diverting the food product to a bypass conveyor if a sensor determines the food product should not be deposited onto the pair of initial supports.

15. A method for stacking food products in accordance with claim 10 further comprising moving the receiving platform in a downward direction to a recessed position below an exit conveyor to transfer the food product from the receiving platform to the exit conveyor.

16. An apparatus for stacking food products, the apparatus comprising:
   a pair of initial supports for directly supporting lateral edges of the food product thereon, the pair of initial supports linearly reciprocating in opposing directions transverse to a downstream feed direction to form a gap through which the food product can fall;
   a conveyor directing the food product in a downstream direction toward the pair of initial supports, the conveyor including a nose conveyor configured to extend and retract to deposit the food product on the pair of initial supports;
   a transport conveyor upstream of the nose conveyor, a bypass conveyor adjacent the transport conveyor, and a diverting conveyor being moveable between a raised position to direct a rejected food product from the transport conveyor to the bypass conveyor and a lowered position to allow a non-rejected food product to continue on the transport conveyor;
   a sensor adjacent the transport conveyor and upstream of the diverting conveyor to detect a predetermined parameter to determine whether the food product is rejected and diverted to the bypass conveyor;
   a pair of accumulating supports positioned below the initial supports to collect the food product after falling through the gap, the accumulating supports linearly reciprocating in opposing directions transverse to the downstream direction at predetermined intervals to form a second gap through which the food product can fall; and
   a receiving platform positioned below the accumulating supports to collect the food product directly thereon after falling through the second gap, the distance between the accumulating supports and the receiving platform increasing with the amount of food product on the receiving platform.

17. An apparatus for stacking food products, the apparatus comprising:
   a pair of initial supports for directly supporting lateral edges of the food product thereon, the pair of initial supports linearly reciprocating in opposing directions transverse to a downstream feed direction to form a gap through which the food product can fall, wherein each initial support includes upwardly inclined segments on an end portion thereof;
   a plurality of the food products being grouped together to travel on discrete carriers, each carrier having a length less than a length of the initial support and a width less than the gap formed when the initial supports reciprocate away from each other into a fully retracted position;
   a pair of accumulating supports positioned below the initial supports to collect the food product after falling through the gap, the accumulating supports linearly reciprocating in opposing directions transverse to the downstream direction at predetermined intervals to form a second gap through which the food product can fall, wherein the pair of initial supports and the pair of accumulating supports each include a plurality of raised segments to support the food product above a floor surface of the supports; and
   a receiving platform positioned below the accumulating supports to collect the food product directly thereon after falling through the second gap, the distance between the accumulating supports and the receiving platform increasing with the amount of food product on the receiving platform.

18. A method for stacking food products, the method comprising:
   advancing a food product on a nose conveyor in a downstream direction, the nose conveyor configured to extend and retract over a pair of initial supports;
   depositing the food product from the nose conveyor directly on the pair of initial supports by extending the nose conveyor over a portion of the pair of initial supports and then retracting the nose conveyor to deposit the food product on the pair of initial supports;
   moving the pair of initial supports linearly away from each other in opposing directions transverse to the downstream direction to form a gap through which the food product can fall, the pair of initial supports moving away from each other after each deposit of the food product;
   accumulating the food product on a pair of accumulating supports below the pair of initial supports;
   moving the pair of accumulating supports linearly away from each other in opposing directions transverse to the downstream direction at predetermined intervals to form a second gap through which the food product can fall;
   collecting the food product directly on a receiving platform positioned below the accumulating supports;
   detecting a predetermined parameter to determine whether the food product should be deposited onto the pair of initial supports; and
   diverting the food product to a bypass conveyor if a sensor determines the food product should not be deposited onto the pair of initial supports.

* * * * *